(12) United States Patent
Viinikanoja et al.

(10) Patent No.: US 7,410,309 B2
(45) Date of Patent: Aug. 12, 2008

(54) OPTICAL SHUTTER

(75) Inventors: Jarkko Viinikanoja, Tampere (FI); Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 292 days.

(21) Appl. No.: 11/102,585

(22) Filed: Apr. 6, 2005

(65) Prior Publication Data

US 2006/0228108 A1    Oct. 12, 2006

(51) Int. Cl.
*G02F 1/00*        (2006.01)
(52) U.S. Cl. .................................. 396/457; 359/228
(58) Field of Classification Search .............. 396/249, 396/452, 457; 359/228; 348/362, 367
See application file for complete search history.

(56) References Cited

U.S. PATENT DOCUMENTS

| | | | | |
|---|---|---|---|---|
| 3,405,623 A | * | 10/1968 | Ford et al. ................. | 396/452 |
| 3,614,211 A | * | 10/1971 | Letter ........................ | 359/222 |
| 4,583,824 A | * | 4/1986 | Lea ............................ | 359/223 |
| 4,701,021 A | * | 10/1987 | Le Pesant et al. ........... | 359/228 |
| 5,956,005 A | * | 9/1999 | Sheridon ..................... | 345/84 |
| 6,033,132 A | * | 3/2000 | Seo ............................ | 396/452 |
| 6,961,167 B2 | * | 11/2005 | Prins et al. .................. | 359/253 |

* cited by examiner

*Primary Examiner*—W. B. Perkey
(74) *Attorney, Agent, or Firm*—Ware, Fressola, Van Der Sluys & Adolphson, LLP (57) ABSTRACT

The invention relates to a shutter for an optical imaging system. An amount of opaque fluid is moved in a planar capillary space to open and close the shutter. Depending on the position of the opaque fluid with respect to an optical path passing through the capillary space, the fluid opens or blocks the optical path. In an embodiment, the opaque fluid is moved by a pressure differential caused by a diaphragm which is coupled to a piezoelectric actuator. In another embodiment, the opaque fluid is moved by electrostatic forces.

16 Claims, 4 Drawing Sheets

OPTICAL SHUTTER

The present invention relates to an optical shutter. The present invention relates also to a device comprising an optical shutter. The present invention further relates to a method to block an optical path.

BACKGROUND OF THE INVENTION

Digital cameras comprise imaging optics which are adapted to focus the image of a target onto an image sensor. The image sensor comprises an array of light sensitive pixels. The plurality of signals provided by the individual pixels constitute the digital image of the target. To the first approximation, a signal provided by each individual pixel is proportional to a time period between resetting or activation of said pixel and shifting of said signal (e.g. charge) to a shift register or to a memory.

A typical low-cost image sensor does not comprise charge shift registers and it cannot hold and store the signals. Thus, when the reading of all signals can not take place simultaneously, the signals obtained from the individual pixels correspond to different time intervals. This may lead to a distortion of the recorded image, image artifacts, when the digital camera or the target is moving.

The problem may be remedied by controlling the optical exposure of all pixels substantially simultaneously by using a so-called global shutter. The signal provided by an individual pixel remains substantially constant after closing the global shutter, and the obtained image corresponds to simultaneous exposure even though the electrical reading of the pixels would not take place simultaneously.

Traditional mechanical global shutters exhibit several drawbacks, e.g. complex mechanical structure, large size and relatively high power consumption. Therefore, mechanically implemented global shutters are not optimal for imaging systems integrated in small portable devices.

U.S. Pat. No. 4,701,021 discloses a light beam intensity modulator for controlled attenuation of a light beam. Said modulator is based on a plurality of successive cells. Each of said cells comprises a capillary space between two transparent plates, and an electric field producing means for applying an electric field between said transparent plates to control the displacement of a partially transparent fluid between said capillary space and a reservoir. Light beam intensity is modulated by moving said partially transparent fluid into the line of the light beam in one or more of the cells. According to the teachings of said US publication, the attenuation provided by a single cell is in the order of 10-90%. Further, according to the teachings of said US publication, the operating time of said cells is in the order of 100 ms.

Hence, such a light beam intensity modulator is not applicable as an effective optical shutter in a camera because of insufficient speed and light attenuation capabilities.

Clearly, there is still room for further development in the field of global optical shutters to create a solution that does not suffer from those disadvantages of the solutions.

SUMMARY OF THE INVENTION

The object of the present invention is to provide a shutter for optical imaging systems.

According to a first aspect of the invention, there is a shutter for an optical imaging system, said shutter comprising at least:
  a capillary space between two substantially transparent surfaces,
  a fluid reservoir in connection with said capillary space,
  an amount of opaque fluid, and
  displacement means to move said amount of opaque fluid from said fluid reservoir to said capillary space to block an optical path passing through said capillary space.

According to a second aspect of the invention, there is a device comprising at least:
  imaging optics,
  an image sensor, and
  a shutter,
  said shutter in turn comprising at least:
  a capillary space between two substantially transparent surfaces,
  a fluid reservoir in connection with said capillary space,
  an amount of opaque fluid, and
  displacement means to move said amount of opaque fluid from said fluid reservoir to said capillary space to block an optical path passing through said capillary space.

According to a third aspect of the invention, there is a method to block an optical path, said optical path passing through a capillary space defined by two substantially transparent surfaces, said method comprising at least moving an amount of opaque fluid from a fluid reservoir to said capillary space to block said optical path.

The shutter according to the present invention is especially suitable for mobile devices comprising optical imaging systems. The shutter according to the present invention may be implemented in small size and it has low power consumption.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in more detail with reference to the appended drawings, in which.

DETAILED DESCRIPTION OF THE INVENTION

Figure 1:
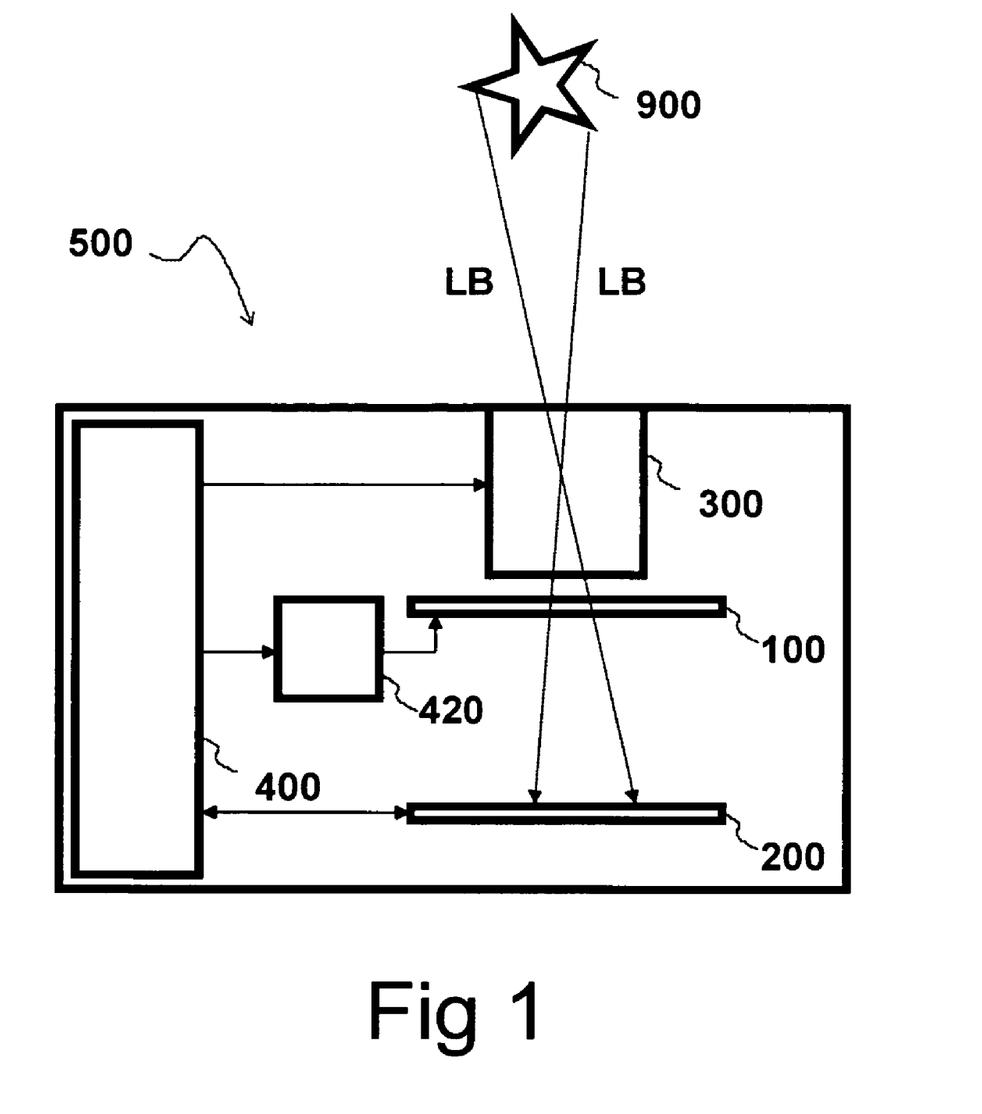
FIG. 1 shows schematically a device comprising imaging optics, an image sensor and a shutter.

Referring to FIG. 1, a device 500 comprises an imaging system. The imaging system comprises imaging optics 300, which are adapted to focus light rays LB transmitted from a target 900 to an image sensor 200 to form an image of the target 900. The optical exposure of the image sensor 200 is at least partially defined by a shutter 100.

The imaging operation is at least partially controlled by a control unit 400, which directly or indirectly controls the imaging optics 300, the shutter 100 and the image sensor 200. The device 500 may further comprise a buffer unit 420 to provide amplification and/or digital-to-analog conversion of signals sent to the shutter 100.

There are various ways to position the shutter 100 with respect to the imaging optics 300 and the image sensor 200. The shutter 100 may be positioned e.g.:

between the target 900 and the imaging optics 300, near the imaging optics 300,
between optical components inside the imaging optics 300,
between the imaging optics 300 and the image sensor 200, near the shutter 100, or
between the imaging optics 300 and the image sensor 200, near the image sensor 200.

It is advantageous to have a shutter with a small active area, i.e. the area which can be optically opened and closed should be minimized to enhance speed and minimize power consumption. When the optical aperture of the imaging optics 300 is greater than the size of the image sensor 200, the shutter 100 may be positioned near the image sensor 200. When the optical aperture of the imaging optics 300 is smaller than the size of the image sensor 200, shutter 100 may be positioned near the imaging optics 300. If the imaging optics 300 are arranged to form an intermediate focus plane before the final focus plane positioned at the image sensor 200, then the shutter 100 may also be positioned at or near said intermediate focus plane.

Figure 2A:
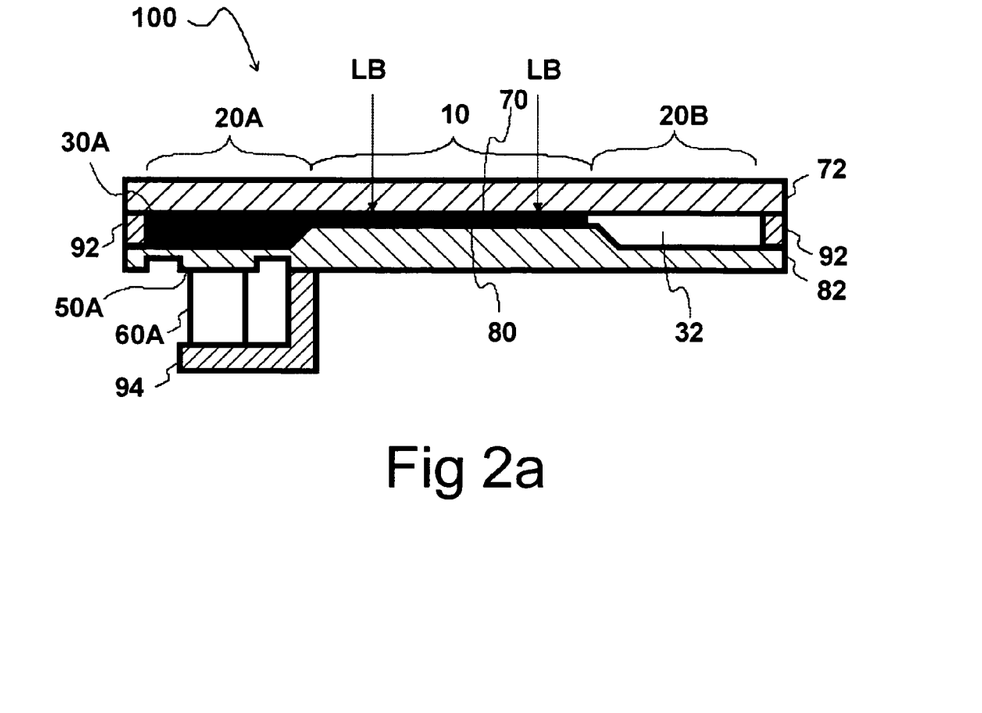
FIG. 2a shows schematically a side view of a shutter comprising one piezoelectric actuator to move opaque fluid, said shutter being in a closed state.
Figure 2B:
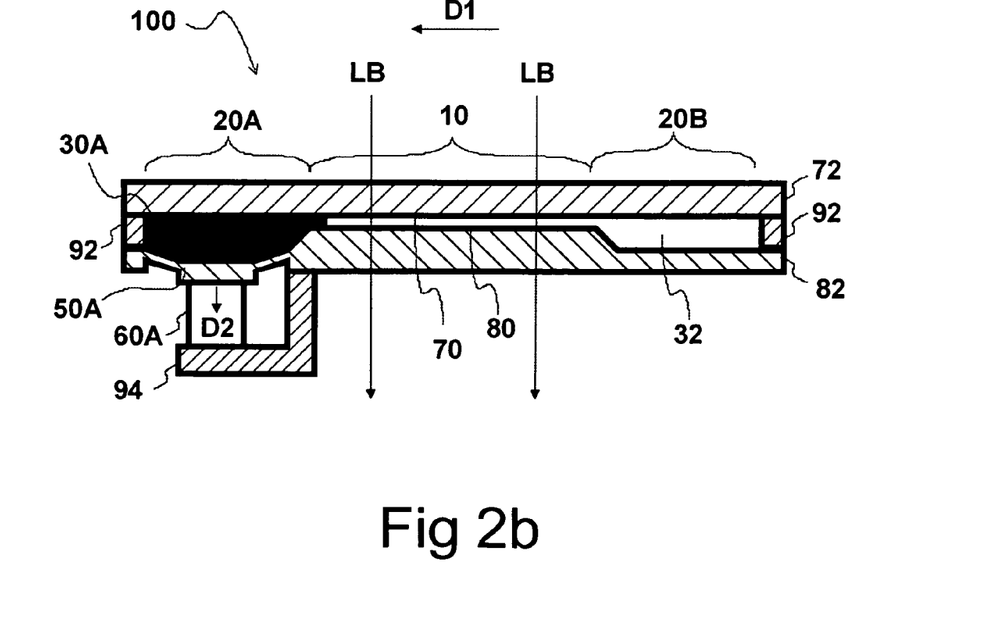
FIG. 2b shows schematically a side view of a shutter comprising one piezoelectric actuator to move opaque fluid, said shutter being in an open state.

The first embodiment of the invention is shown in FIGS. 2a and 2b. Referring to FIG. 2a, the shutter 100 comprises an upper plate 72 and a lower plate 82. The upper plate 72 and the lower plate 82 are joined together by a sealing spacer 92. The plates 72, 82 comprise two substantially planar and substantially transparent surfaces 70, 80, which define a substantially planar capillary space 10 between each other. The capillary space 10 is coupled to a first reservoir 20A and to a second reservoir 20B. The first reservoir 20A and the capillary space 10 are filled with an amount of substantially opaque fluid 30A. The second reservoir 20B is filled with pressurized gas 32.

The shutter 100 is shown in its closed state in FIG. 2a. The capillary space 10 is filled with the opaque fluid 30A. The fluid 30A blocks an optical path passing through the surfaces 70, 80 and the capillary space 10 such that the light beams LB can not pass through the shutter 100.

In the first embodiment, the operation of the shutter 100 is based on moving the opaque fluid 30A using pressure differential. The lower plate 82 comprises a first diaphragm 50A to change the internal volume of the first reservoir 20A. The diaphragm is coupled to a first piezo-electric actuator 60A. The first piezo-electric actuator 60A is fixed to a support 94, which is attached to the lower plate 82. The first piezo-electric actuator 60A is adapted to contract when coupled to a voltage provided by the buffer unit 420 (FIG. 1).

The shutter 100 may be arranged in such a manner that it does not consume any power in its closed state.

Referring to FIG. 2b, the shutter 100 is opened by contracting the first piezoelectric actuator 60A. The first diaphragm 50A moves in the direction D2 which increases the internal volume of the first reservoir 20A. The internal pressure prevailing in the first reservoir 20A is decreased with respect to the internal pressure prevailing in the second reservoir 20B. The opaque fluid 30A moves in the direction D1. The fluid 30A is rapidly displaced from the capillary space 10. The displacement of the fluid 30A takes place due to adhesive forces between the diaphragm and the fluid 30A, due to cohesive forces within the fluid 30A itself, and due to the gas pressure prevailing in the second reservoir 20B.

When the fluid is displaced, the optical path passing through the shutter 100 is opened, allowing the light beams LB to pass through the shutter 100.

After a predetermined exposure time, the shutter 100 is closed again by expanding the first piezo-electric actuator 60A. The first diaphragm 50A moves in the direction opposite to the direction D2 and the fluid 30A moves in the direction opposite to the direction D1, blocking the optical path. The piezo-electric actuator 60A may comprise an optional spring member (not shown) that helps it to resume its original rest position when no drive electricity is connected to said actuator.

The plate 82 may be constructed of e.g. polycarbonate to provide transparency in the vicinity of the capillary space 10 and to provide flexibility in the vicinity of the diaphragm 50A. The plates 72, 82 may further comprise glass to improve structural stability. The plates 72,82 may be coated with antireflection coatings to reduce optical reflection losses.

The opaque fluid 30A may have a low viscosity to maximize the speed of the shutter 100.

To minimize wetting of the surfaces 70,80 with the fluid 30, the surface tension of the opaque fluid 30A may be greater than the critical surface tension of the surfaces 70, 80. Thus, the surfaces 70, 80 repel the opaque fluid 30A, which leads to the minimization of the common interfacial area between the fluid 30A and the surfaces 70, 80. This facilitates maintaining the stable form of the interface between the fluid 30 and the gas 31. The surfaces 70, 80 may be coated with a suitable material, e.g. fluoropolymer or silicone-based material, in order to achieve low critical surface tension.

The opaque fluid may comprise a liquid solvent with a suitable mixture of dyes to provide high optical absorbance in the required wavelength range. Dyes are typically colorful and a mixture of dyes may be required to implement high absorption in a broad wavelength range. The shutter 100 may be used in combination with an optical filter blocking infrared light. The solvent may be a suitable polar or non-polar solvent having a relatively high surface tension when compared with the critical surface tension of the surfaces 70, 80. The solvent may be e.g. water, a mixture of water and anti-freezing agent, nitromethane or nitrobenzene. The dyes are selected such that they do not permanently stain or contaminate the surfaces 70, 80.

The opaque fluid 30A may also be a suspension of absorbing particles in a liquid, e.g. an ink.

The opaque fluid 30A may also be a reflecting liquid such as mercury or eutectic indium-gallium alloy.

Figure 3A:
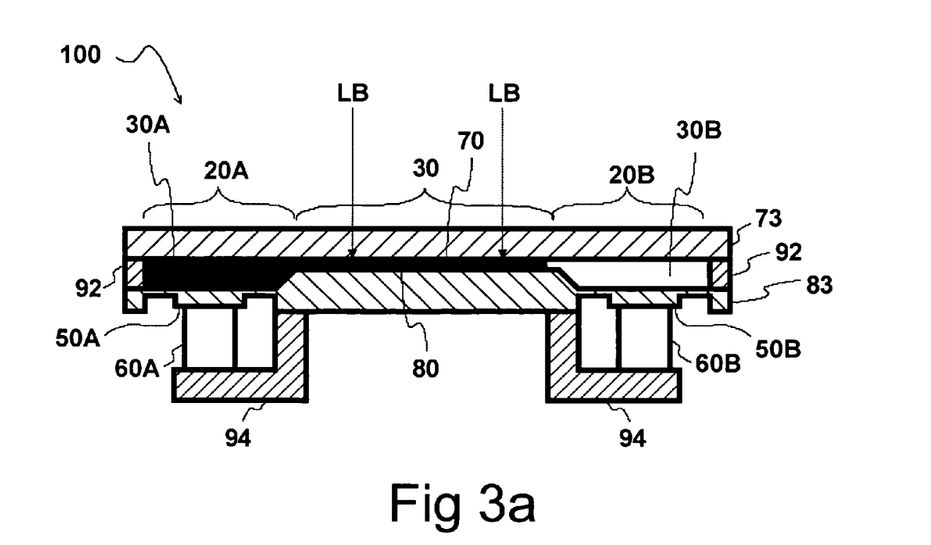
FIG. 3a shows schematically a side view of a shutter comprising two piezoelectric actuators to move opaque fluid, said shutter being in a closed state.
Figure 3B:
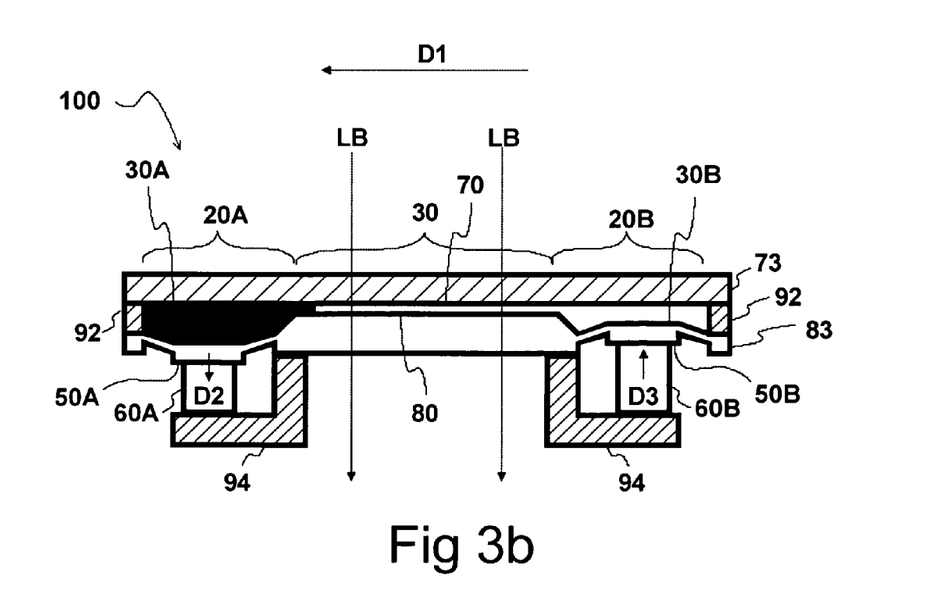
FIG. 3b shows schematically a side view of a shutter comprising two piezoelectric actuators to move opaque fluid, said shutter being in an open state.

The second embodiment of the present invention is shown in FIGS. 3a and 3b. Referring to FIG. 3a, the shutter 100 of the second embodiment comprises an upper plate 74 and a lower plate 84. The plates 74, 84 are joined together by the sealing spacer 94. The plates 74, 84 comprise two substantially planar and substantially transparent surfaces 70, 80, which define the substantially planar capillary space 10 between each other. The capillary space 10 is coupled to the first reservoir 20A and to the second reservoir 20B. The first reservoir 20A and the capillary space 10 are filled with an amount of substantially opaque fluid 30A.

The second reservoir 20B is filled with a transparent fluid 30B. The shutter 100 is shown in its closed state in FIG. 3a.

The shutter 100 comprises a first diaphragm 50A and a first piezo-electric actuator 60A to change the internal volume of the first reservoir 20A. Further, the shutter 100 comprises a second diaphragm 50B and a second piezo-electric actuator 60B to change the internal volume of the second reservoir 20B.

Referring to FIG. 3b, the shutter 100 is opened by contracting the first piezoelectric actuator 60A and/or by expanding the second piezoelectric actuator 60A. Consequently, the opaque fluid 30A and the transparent fluid 30B move in the direction D1. The displacement of the fluids takes place due to the increase of pressure in the second reservoir 20B, due to adhesive forces between the diaphragm and the fluids, and due to cohesive forces within the fluids 30A, 30B.

When the fluids are displaced, the optical path passing through the shutter 100 is opened, allowing the light beams LB to pass through the shutter 100.

After the predetermined exposure time, the shutter 100 is closed again by expanding the first piezo-electric actuator 60A and by contracting the second piezo-element 60B. The first diaphragm 50A moves in the direction opposite to the direction D2 and the fluid 30A moves in the direction opposite to the direction D1, blocking the optical path.

The opaque fluid 30A and the transparent fluid 30B are selected such that they are mutually immiscible. The opaque fluid 30A may comprise dyes, but they must not dissolve in the transparent fluid 30B.

The transparent fluid 30B may have high refractive index. An advantage associated with the use of a high refractive index liquid as the transparent fluid 30B is that antireflection coatings may be omitted from the surfaces 70, 80.

Alternatively, one of the piezo-electric actuators 60A, 60B may be replaced by a mechanical or pneumatic spring mechanism. The spring mechanism may be integrated into one of the diaphragms 50A, 50B. Also, one or both of the piezo-electric actuators 60A, 60B may comprise an optional spring member arranged to help to resume the original rest position of said actuator when no drive electricity is connected to said actuator.

Figure 4A:
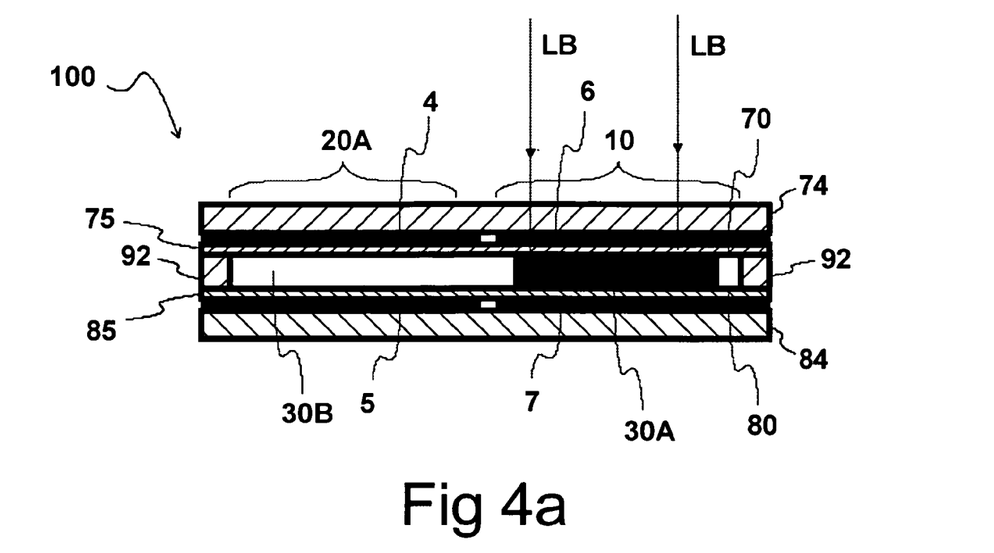
FIG. 4a shows schematically a side view of a shutter comprising two electrode pairs to move opaque fluid, said shutter being in a closed state.
Figure 4B:
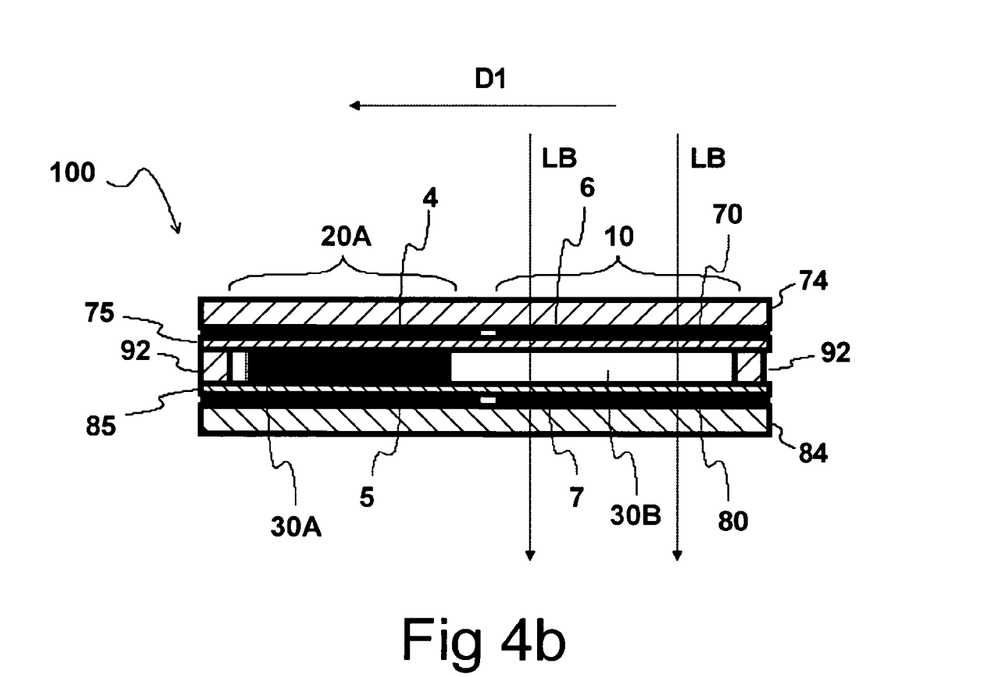
FIG. 4b shows schematically a side view of a shutter comprising two electrode pairs to move an opaque fluid, said shutter being in an open state.

The third embodiment of the present invention is shown in FIGS. 4a and 4b. The third embodiment is based on moving the opaque fluid 30 by electrostatic forces. Referring to FIG. 4a, the shutter 100 comprises substantially transparent plates 74, 84 which are joined together by a spacer 92. A first pair of electrodes 4, 5 and a second pair of electrodes 6, 7 are implemented on the plates 74, 84. Further insulating layers 75, 85 are deposited over the electrodes 4, 5, 6, 7. The surfaces 70, 80 of the protective layers 75, 85 in the vicinity of the second pair of electrodes 6, 7 define a capillary space 10. A part of the space between the protective layers 75, 85 acts as a fluid reservoir 20A. The fluid reservoir 20A is coupled to the capillary space 10.

In this embodiment the opaque fluid 30A has relatively high dielectric permittivity and therefore it is attracted by an electrostatic field. The capillary space 10 comprises also a transparent fluid 30B having relatively low permittivity.

FIG. 4a shows the shutter 100 in its closed state. A voltage difference is applied over the first pair of electrodes 4, 5. The electric field prevailing between the electrodes 4, 5 stabilizes the position of the opaque fluid 30A between said first pair of electrodes 4, 5 such that the optical path passing through the shutter is blocked.

Referring to FIG. 4b, the shutter is opened by applying a voltage difference over the second electrode pair 6, 7 and by removing the voltage difference from the first electrode pair 4, 5. Consequently, the electric field displaces the opaque fluid 30A in the direction D1 such that the optical path is opened.

After the predetermined exposure time, the shutter 100 is closed again by applying a voltage difference over the first electrode pair 4, 5 and by decoupling the voltage from the second electrode pair 6, 7.

At least the second pair of electrodes 6, 7 must be substantially transparent. The electrodes 6, 7 may be implemented using e.g. indium tin oxide (ITO). Alternatively, mesh or grid pattern electrodes may be used.

The shutter 100 is hermetically sealed. There may be a channel (not shown) to allow the flow of the transparent fluid 30B from one side of the opaque fluid 30 to the other side, in order to prevent pressure buildup.

The form and the arrangement of the electrodes define the form of the electric field, which, in turn, defines the form of the front of the opaque fluid 30A.

The opaque fluid 30A comprises liquid having relatively high permittivity such as water, a mixture of water and antifreezing agent, nitromethane or nitrobenzene. One or more dyes may be dissolved into the liquid to provide opaqueness.

The insulating layers 75, 85 may be omitted when using liquids with low electric conductivity. Noble metal electrodes may be used to minimize corrosion.

The transparent fluid 30B may be gas or liquid. The movement velocity depends on the applied electric field, which in turn is limited by the dielectric breakdown strength of the opaque fluid 30A and the transparent fluid 30B. A clear liquid having high dielectric breakdown strength, e.g. silicone oil may be used instead of a gas.

Alternatively, the opaque fluid 30A may have a relatively low permittivity and the transparent fluid 30B may have a relatively high permittivity.

In a fourth embodiment (not shown in Figs.), only one electrode pair is used to move the opaque fluid 30A. The restoring movement is achieved by using gas pressure in a reservoir.

In a fifth embodiment (not shown in Figs.), the pressure differential may be used in combination with the electrostatic forces to move the opaque fluid 30A.

In a sixth embodiment (not shown in Figs.), the opaque fluid 30A is moved by the pressure differential. Electrostatic forces are further used to stabilize the form of the moving front of the opaque fluid 30A In a seventh embodiment (not shown in Figs.), the pressure differential may be caused using a substance which has a high vapor pressure. The substance may be heated by a resistive element to provide a rapid increase of pressure in one of the reservoirs 20A and/or 20B.

In an eighth embodiment (not shown in Figs.), a magnetic fluid and an electromagnet may be used to move the opaque fluid 30A. The magnetic fluid may comprise a base liquid, ferromagnetic particles and a chemically adsorbed surfactant. In general, the opaque fluid 30 may be moved by magnetic forces.

In a ninth embodiment (not shown in Figs.), an opaque and electrically conducting fluid 30A, e.g. mercury, may be moved by coupling an electric current through said fluid 30A and exerting a displacement force to the fluid 30A using a magnetic field generated by an electromagnet.

Referring back to FIG. 1, the device 500 may be a digital camera. The device 500 may be a digital video camera. The device 500 may be any portable device comprising an imaging system. The device 500 may be a mobile device comprising an imaging system. The device 500 may be, for example, a mobile phone comprising an imaging system. Yet, the device 500 may be a data processing device comprising an imaging system.

The image sensor 200 comprises an array of light-sensitive pixels. The image sensor 200 may be implemented e.g. using charged coupled device (CCD) technology, or complementary metal oxide semiconductor technology (CMOS). The image sensor 200 may also be implemented using phototransistors or silicon photodiodes.

The image of the target 900 may be obtained for example by a method comprising at least the steps of:
resetting or activating substantially all pixels of the image sensor 200,
opening the shutter 100,
exposing the pixels to light during a predetermined exposure time,
closing the shutter 100, and
reading the signals from the pixels to a memory or signal processing unit.

In this case both the opening and closing of the shutter 100 are critical.

Alternatively, the image of the target 900 may be obtained for example by a method comprising at least the steps of:
opening the shutter 100,
resetting or activating substantially all pixels of the image sensor 200,
exposing the pixels to light during a predetermined exposure time,
closing the shutter 100, and
reading the signals from the pixels to a memory or signal processing unit.

In this case the timing of the opening of the shutter 100 is not critical.

The opening of the shutter 100 may take place relatively slowly.

Optical exposure times provided by the shutter 100 may be shorter than 10 milliseconds. Consequently, the shutter 100 should be closed in a time period shorter than said 10 milliseconds. In order to reach a closing time shorter than 10 ms, the maximum instantaneous velocity of the fluid during the closing of the shutter 100 should be greater than 1 m/s, considering that the diameter of the imaging optics is typically in the order of 10 mm.

Preferably, a single layer of opaque fluid 30A provides the required level of blocking. The maximum allowable transmittance $TR_{MAX}$ of the opaque fluid 30A is determined by the predetermined exposure time $T_{EX}$ and the time period $T_{READ}$ required for reading all pixels of the image sensor 200. The reading time $T_{READ}$ is the time period between closing the shutter 100 and reading the last pixel of the image. The maximum allowable transmittance $TR_{MAX}$ may be estimated from the equation:

$$TR_{MAX} = \frac{T_{EX}}{T_{READ}}. \quad (1)$$

The transmittance of the opaque fluid 30A may be, for example, smaller than or equal to 0.1 times $TR_{MAX}$. In that case, when the exposure time $T_{EX}$ is 10 ms and the reading time $T_{READ}$ is 100 ms, the transmittance of the opaque fluid 30 should be smaller than 1%, respectively. To obtain a high quality image, said image having excellent contrast (brightness ratio 1:1000), the transmittance of the opaque fluid 30A may be smaller than or equal to 0.001 times $TR_{MAX}$.

The concentration of the dyes and the thickness of the capillary space 10 are selected to provide the required optical transmittance.

In principle, the global shutter 100 according to the invention may also be used to control only the start of the exposure of the image sensor 200, and the end of the exposure period may be controlled in some other manner, if desired.

For a person skilled in the art, it will be clear that modifications and variations of the devices and the method according to the present invention are perceivable. The particular embodiments described above with reference to the accompanying drawings are illustrative only and not meant to limit the scope of the invention, which is defined by the appended claims.

What is claimed is:

1. An optical shutter, said shutter comprising:
a capillary space between two substantially transparent surfaces,
a fluid reservoir in connection with said capillary space,
an amount of opaque fluid,
an amount of substantially transparent fluid in direct contact with said amount of opaque fluid, and
a displacement device to move said amount of opaque fluid from said fluid reservoir to said capillary space to block an optical path passing through said capillary space,
wherein said displacement device comprises a first diaphragm coupled to a first piezoelectric actuator and a second diaphragm coupled to a second piezoelectric actuator, and
wherein said amount of opague fluid is moved from said fluid reservoir by contracting the first piezoelectric actuator and expanding the second piezoelectric actuator.

2. The shutter according to claim 1, wherein said first diaphragm and said second diaphragm are configured to change the internal pressure of said reservoir.

3. The shutter according to claim 1, wherein said first diaphragm and said second diaphragm are configured to change the internal volume of said fluid reservoir.

4. The shutter according to claim 1, wherein said opaque fluid is light absorbing liquid.

5. The shutter according to claim 1, wherein said opaque fluid is light reflective liquid.

6. The shutter according to claim 1, wherein a time period for blocking of said optical path is adapted to be shorter than or equal to 10 milliseconds.

7. The shutter according to claim 1, wherein the instantaneous velocity of said opaque fluid in said capillary space is adapted to be greater than or equal to 1 m/s.

8. A device, comprising:
imaging optics,
an image sensor, and
a shutter,
wherein said shutter comprises:
a capillary space between two substantially transparent surfaces,
a fluid reservoir in connection with said capillary space,
an amount of opaque fluid,
an amount of substantially transparent fluid in direct contact with said opaque fluid, and
a displacement device to move said amount of opaque fluid from said fluid reservoir to said capillary space to block an optical path passing through said capillary space,
wherein said displacement device comprises a first diaphragm coupled to a first piezoelectric actuator and a second diaphragm coupled to a second piezoelectric actuator, and wherein said amount of opaque fluid is moved from said fluid reservoir by contracting the first piezoelectric actuator and expanding the second piezoelectric actuator.

9. The device according to claim 8, wherein said device is a portable device.

10. The device according to claim 8, wherein said device comprises wireless communication capabilities.

11. A method to block an optical path, said optical path passing through a capillary space between two substantially transparent surfaces, said method comprising:

contracting a first piezoelectric actuator coupled to a first diaphragm,     expanding a second piezoelectric actuator coupled to a second diaphragm, and     moving an amount of opaque fluid from a fluid reservoir to said capillary space to block said optical path as a result of contracting said first piezoelectric actuator and expanding said second piezoelectric actuator,     wherein said opaque fluid is in direct contact with a substantially transparent fluid in said capillary space.

12. The method according to claim 11, further comprising changing the internal volume of said reservoir by moving said first diaphragm by contracting said first piezoelectric actuator.

13. The method according to claim 11, wherein said opaque fluid is light absorbing liquid.

14. The method according to claim 11, wherein said opaque fluid is light reflecting liquid.

15. The method according to claim 11, wherein the duration of said movement of said opaque fluid is shorter than or equal to 10 milliseconds.

16. The method according to claim 11, wherein said method is used to control the optical exposure of an image sensor, the transmittance of said opaque fluid in said capillary space being smaller than or equal to 0.1 times a predetermined exposure time divided by a time period required for reading all pixels of an image sensor.

\* \* \* \* \*

UNITED STATES PATENT AND TRADEMARK OFFICE
CERTIFICATE OF CORRECTION

PATENT NO. : 7,410,309 B2　　　　　　　　　　　　　　　　　　　　　　　　Page 1 of 1
APPLICATION NO. : 11/102585
DATED : August 12, 2008
INVENTOR(S) : Viinikanoja et al.

It is certified that error appears in the above-identified patent and that said Letters Patent is hereby corrected as shown below:

1. In column 8 at line 28 (claim 1, line 15), please delete "opague" and insert --opaque-- therefor.

Signed and Sealed this

Eleventh Day of November, 2008

JON W. DUDAS
*Director of the United States Patent and Trademark Office*